United States Patent [19]

Caris

[11] 4,278,139

[45] Jul. 14, 1981

[54] WEIGHING APPARATUS WITH OVERLOAD PROTECTION FOR OFF-CENTER LOADING

[75] Inventor: Richard F. Caris, Scottsdale, Ariz.

[73] Assignee: Interface, Inc., Scottsdale, Ariz.

[21] Appl. No.: 63,437

[22] Filed: Aug. 3, 1979

Related U.S. Application Data

[63] Continuation of Ser. No. 903,561, May 8, 1978.

[51] Int. Cl.³ .................... G01G 23/02; G01G 21/10
[52] U.S. Cl. .................................. 177/154; 177/189; 177/255
[58] Field of Search ............... 177/154, 189, 211, 255, 177/DIG. 9

[56] References Cited

U.S. PATENT DOCUMENTS

| 2,742,278 | 4/1956 | Carleton, Jr. | 177/189 |
| 3,847,238 | 11/1974 | Hall et al. | 177/255 |
| 3,869,007 | 3/1975 | Haggstrom et al. | 177/DIG. 9 |
| 4,067,408 | 1/1978 | Dodds et al. | 177/255 X |
| 4,095,659 | 6/1978 | Blench et al. | 177/154 X |

*Primary Examiner*—George H. Miller, Jr.

[57] ABSTRACT

A strain gage load cell scale is provided with overload protection that is external to the load cell and which compensates for off-center loading of the weighing platform. The weighing platform is attached to the load receiving surface of the load cell by a number of outwardly extending arms. Two sets of stops are provided under the weighing platform with different spacing therefrom to provide the external overload protection.

14 Claims, 2 Drawing Figures

WEIGHING APPARATUS WITH OVERLOAD PROTECTION FOR OFF-CENTER LOADING

This is a continuation of copending application Ser. No. 903,561, filed May 8, 1978.

BACKGROUND OF THE INVENTION

This invention relates to electronic weighing apparatus of the type utilizing a strain gage load cell as the active element which provides the electrical signal indicative of the weight of an article.

Recent advances in the force measurement field have taken place primarily due to the improvement in the operating characteristics of the strain gage load cell. The load cell is a transducer which when subjected to certain forces provides an accurate electrical indication of the force or forces to be measured. These versatile transducers are being utilized in an ever increasing number of applications due to several important operating characteristics including the insensitivity of the load cell to off-center loading.

The ability of the load cell to measure weight directly and accurately has resulted in their use in electronic scales wherein compression loads from the weighing platform are applied to the load receiving surface of the load cell. One advantage to the electronic weighing apparatus is the absence of flexures, pivots and adjustments and, as a result, the weighing platform is directly coupled to the load receiving surface of the load cell.

The weighing platform of the apparatus is normally required to have a large surface area so that bulky articles can be readily accommodated thereon. However, the load receiving surface of a load cell may be less than one square inch so that the weighing platform and the supporting frame therefor extend outwardly a substantial distance from the load cell. The supporting frame for the weighing platform provides the needed support through a number of force translating arms which extend outwardly from the load cell to the peripheral region of the weighing platform.

When the article to be weighed is placed in the central portion of the weighing platform, the load is shared by the supporting arms. To provide protection to the load cell in the situation where the article exceeds the measuring capacity of the load cell, stops have been located near the periphery of the weighing platform so that upon a predetermined deflection by the applied weight the stop limits further deflection.

However, the placement of the article upon the peripheral portion of the weighing platform generally results in an unequal sharing of the force by the supporting arms and in certain situations, one may translate the entire force to the load cell. Consequently, the rated load in this situation results in substantially greater platform deflection than the placement of the rated load in the center of the platform. To provide overload protection for the condition wherein the entire rated load is dropped by the operator at the center of the platform, the gaps between the stops and the underside of the weighing platform are substantially reduced thereby derating the scale.

Further protection for the load cell has been provided by the incorporation of a protective structure within the load cell. This typically is the use of a gapped structure for the cell body with the gap size being determined by the largest static load to be expected. Since the weighing apparatus has been found to experience dynamic loads during operation which are significantly higher than the static protection provided, the failure rate of load cells in weighing apparatus increases. The dynamic condition, wherein an article with the rated capacity of the apparatus is dropped on the weighing platforms, provides a high impulse causing the stress to build quickly and then almost instantaneously reverse subjecting the structure to a load greatly exceeding that of the static load counterpart. Thus, external stops and the derating of the weighing apparatus are normally utilized in combination with the internal protection.

Additional measures taken to decrease the failure rate of load cell weighing apparatus have utilized a stiffer and stronger load cell therein. While this approach has tended to reduce the failure rate, the system is less sensitive to a given load and consequently a lower electrical signal is generated by the commerically available strain gages affixed to a stiffer load cell structure. Since the load cell output signal is in the millivolt range, the lower signal level is undesirable due to the lower signal to noise ratio and the fact that the sensitivity of succeeding electronic devices is normally required to be increased.

Accordingly, the present invention is directed to a strain gage load cell weighing apparatus wherein improved overload protection for static and dynamic loading is provided. The overload protection enables the derating of load cell and scale capacity to be substantially reduced and, further, the use of the sensitive measuring instrument itself for overload protection is not required.

BRIEF SUMMARY OF THE INVENTION

The present invention is concerned with electronic weighing instruments wherein a strain gage load cell has the compression loads from a weighing platform applied thereto and provides an electrical output signal which is indicative of an article on the weighing platform.

The weighing instrument includes a frame member which engages the supporting surface. The load cell is affixed to the frame member with the load cell receiving surface facing upward. A weighing platform having first and second surfaces overlies the load cell and is coupled to the load receiving surface by support means.

The load cell is substantially smaller than the weighing platform and is centrally located thereunder. A first overload protective means is connected to the frame member and extends upwardly toward the second surface of the weighing platform and is spaced from the platform and support means by a first distance. The first means is located on the frame member proximate to the load cell. In addition, a second overload protective means is connected to the frame member and extends upwardly toward the second surface of the weighing platform. The second means includes a plurality of stop members which are spaced a second distance from the peripheral portion of the platform and the support means attached thereto.

The second protective means is spaced a greater distance from the platform and its support means than the first protective means. The placement of a load on the weighing platform causes a deflection of the platform in a downward direction and for loads centrally located on the weighing platform, the overload protection means is encountered after a deflection equal to the first distance. However, loads applied at the peripheral portion of the weighing platform encounter the second overload protection means after the peripheral portion has been deflected downwardly by the second distance. By utilizing the differently located and spaced protection means, improved static and dynamic overload protection of the load cell is provided.

Since the electronic weighing apparatus utilizing a load cell is often placed in a service area where it is used by a large number of people, the dynamic overload protection which prevents damage to the load cell from an article dropped onto the weighing platform is a significant and necessary requirement for wide scale commercial acceptance.

Further features and advantages of the invention will become more readily apparent from the following detailed description of a specific embodiment of the invention when taken in conjunction with the accompanying drawings.

DESCRIPTION OF THE PREFERRED EMBODIMENT

Figure 1:
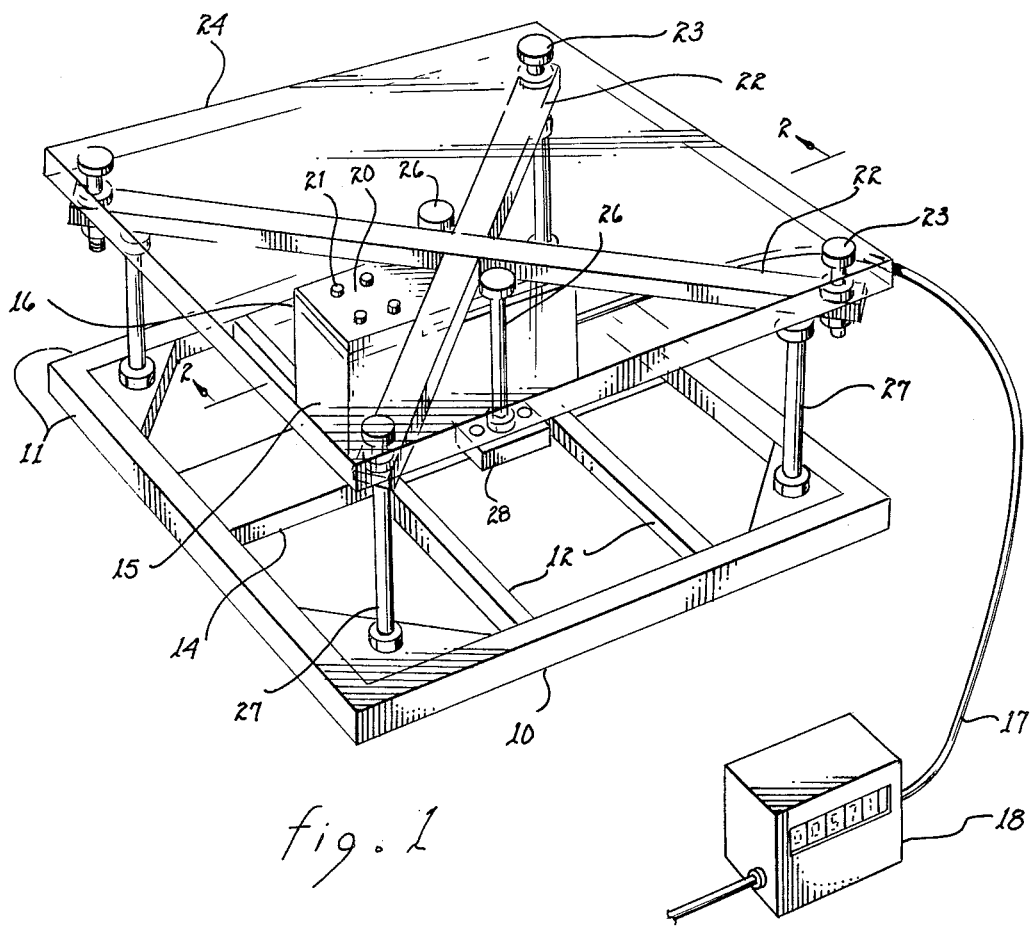
FIG. 1 is a view in perspective of an electronic weighing apparatus utilizing one embodiment of the present invention.

Referring now to the embodiment of FIG. 1, a rectangular frame member 10 is shown formed with edge members 11, central support members 12 and transverse supporting element 14 upon which load cell 15 is affixed.

The frame is adapted to rest on a horizontal supporting surface and may be formed of welded steel components. Near the central portion of supporting element 14, holes (not shown) are provided to permit the load cell 15 to be fastened to the frame member 10.

Load cell 15 contains strain gages internally mounted on the structure in a manner so as to be responsive to the induced strain resulting from a compression force applied between its top and bottom surfaces. The bottom surface is referred to herein as the mounting surface and a raised surface portion is provided at one corner region of the load cell for affixation to element 14. The diagonally opposing portion of the upper surface of the load cell is referred to herein as the load surface and contains raised portion 16 having threaded holes therein. Strain gage load cells of this type are commercially available and further description of the construction of the cell is not necessary for the present invention. One strain gage load cell tested and operated successfully with this invention is the Single Point Load Cell, Model SP-25 having a rated capacity of 25 lbs., manufactured and sold by Interface, Inc., 7401 E. Butherus Drive, Scottsdale, Arizona.

The electrical signal from the internally mounted strain gages is supplied via conductor 17 to a digital indicating device 18 which is coupled to an external power supply. This signal in combination with indicating device 18 provides a direct readout of an article being weighed.

Figure 2:
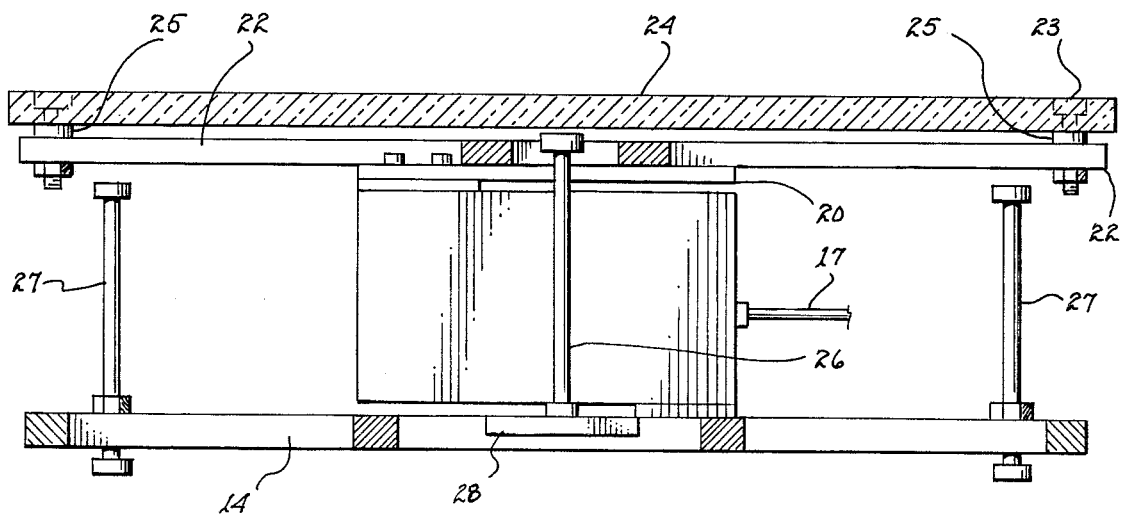
FIG. 2 is a side view in section of the embodiment of FIG. 1 taken along line 2—2.

A flat plate 20 is secured to the load surface of load cell 15 by screws 21 and extends across the top surface thereof. Four outwardly extending arms 22 are affixed to plate 20, for example by welding, and extend out toward the corners of the frame member in the embodiment of FIG. 1. The extending arms are each provided with a hole at their outer end for receiving bolts 23. The weighing platform 24 is secured to the arms 22 by the bolts and a resilient spacer 25 is interposed therebetween to insure that the platform is secured at its peripheral region and does not contact the outwardly extending arms 22 directly as noted from FIG. 2. In addition, the resilient spacers 25 provide a degree of shock absorbence to the structure.

The supporting element 14 is provided with tab members 25 located on opposite sides of the load cell 15. The first overload protective means includes the two stops 26 which extend upwardly from each tab member 25 toward the underside of the weighing platform. The stops are located proximate to the portion of load cell 15 having arms 22 attached thereto. Thus, the stops 26 are located near the geometric center of the weighing platform. The stops are spaced from the underside of the platform by a first distance which is a function of the number of supporting arms 22, the rated capacity of the load cell and the material used for the weighing platform and the supporting arms.

The placement of a load on the central region of the weighing platform results in the translation of the compression force via the arms to the load surface of the cell 15. The weight of the load and the speed with which it encounters the platform determine the amount of downward deflection of the platform. Thus, the first distance which is between stop 26 and the platform is such that the weighing platform contacts the stop prior to exceeding the permissible stress level that cell 15 can withstand. While static limitations are normally provided by the manufacturer, the dynamic situation wherein the user drops a load on the platform is most important.

The apparatus is provided with second protective means which includes stops 27 affixed to the edge members 11 and extending upwardly toward the extending arms 22 which are fastened to the underside of the weighing platform. Stops 27 are spaced from the extending arms by a second distance. In the embodiment shown utilizing a rigid weighing platform, the second distance is greater than the first spacing distance of stops 26. Since the weighing platform is likely to have a rated load dropped on the platform within its peripheral region, the stops 27 are located to limit the deflection of this region to the second distance. However, the force is translated primarily through a single arm 22 to the load cell 15 and the deflection for a given load in this embodiment is greater than a centrally applied load. Consequently, the second distance in the embodiment shown is four times greater than the first distance. In embodiments utilizing a different number of supporting arms and different materials for construction, the relationship between the first and second distances is varied to provide the desired overload protection for both central and peripheral loading.

In operation, the first stops 26 permit the load cell to be protected in the case of centrally applied overloads while enabling the peripheral stops 27 to be spaced further from the contact area of the extending arms or weighing platform so that rated loads can be accommodated across the weighing platform. Also, the first stops 26 are found to provide additional protection to the load cell in the case of the high impact load arriving at or near the peripheral portion of the weighing platform since the deflection of the platform causes the central portion to contact stops 26 in addition to being limited by a contacting of the stops 27. This dynamic protective aspect of the invention is significant in view of the fact that high impact loads provide a stress that greatly exceeds that of the static load counterpart. This is due to the fact that the acceleration of the platform increases rapidly and then drops to zero almost instantaneously thereby providing a reverse stress of equivalent magnitude.

The stops 26 and 27 are preferably mounted in threaded receiving holes in the frame so that the spacing to the undersurface of the weighing platform can be readily adjusted. Also, the weighing platform may be provided with a frame member to provide increased rigidity. In the embodiment shown in FIGS. 1 and 2, the stops 27 are positioned to contact the extending arms 22 with the distance therebetween determining the limit of movement of the weighing platform. However, other embodiments may be utilized wherein the stops 27 directly contact the weighing platform with the spacing therebetween being that of the embodiment shown.

While the above description has referred to a specific embodiment of a measuring instrument utilizing the invention it is recognized that variations and modifications may be made therein without departing from the spirit and scope of the invention.

What is claimed is:

1. A weighing instrument of the type utilizing a load cell which comprises:
   (a) a frame for engaging a supporting surface;
   (b) load cell means having a mounting surface and a load receiving surface, the mounting surface engaging said frame, said load cell means providing an output signal in response to forces applied between the surfaces;
   (c) a weighing platform having first and second opposing surfaces, said first surface receiving an article to be weighed;
   (d) means for coupling the weighing platform to the load receiving surface of the load cell means;
   (e) first overload protective means connected to said frame proximate to the load cell means and extending toward said weighing platform, said first overload protective means being spaced from the second surface of said weighing platform by a first distance; and
   (f) second overload protective means mounted on said frame and spaced from said load cell means, said second means being spaced from said weighing platform by a second distance, said second distance being greater than said first distance whereby overload protection of said load cell means is provided which is substantially independent of the location of the article on the weighing platform.

2. Apparatus in accordance with claim 1 wherein said second overload protective means comprises a plurality of upwardly extending stop members attached to said frame at spaced locations thereon, said stop members being spaced from the second surface of the weighing platform.

3. Apparatus in accordance with claim 2 wherein said plurality of stop members are located on said frame so that the stop members extend upwardly toward the peripheral portion of the second surface of the weighing platform.

4. Apparatus in accordance with claim 3 wherein said first overload protective means comprises a pair of upwardly extending stop members attached to said frame, each of said pair being spaced adjacent to opposing sides of the load cell means and spaced from the second surface of the weighing platform by the first distance.

5. Apparatus in accordance with claim 4 wherein said first and second overload protective means are adjustably mounted on the frame to permit the first and second distances to be independently determined.

6. Apparatus in accordance with claim 4 wherein said means for coupling the weighing platform to the load receiving surface of the load cell means comprises a plurality of support arms having first and second ends, said first ends being affixed to the load receiving surface of the load cell means and said second ends being secured to the peripheral portion of the weighing platform.

7. Apparatus in accordance with claim 6 wherein said second overload protective means includes n stop members and said means for coupling the weighing platform includes n support arms.

8. Apparatus in accordance with claim 6 wherein said means for coupling the weighing platform to the load cell includes n support arms and said second distance of the second overload protective means is n times as large as said first distance of the first overload protective means.

9. Apparatus in accordance with claim 6 further comprising resilient coupling means interposed between the second ends of the support arms and the peripheral portion of the weighing platform.

10. A measuring instrument of the type utilizing a load cell which comprises:
    (a) a frame for contacting a supporting surface;
    (b) load cell means having a mounting surface and a load receiving surface, the mounting surface engaging said frame, said load cell means providing an output signal in response to forces applied between the surfaces;
    (c) a weighing platform having first and second opposing surfaces, said first surface receiving an article to be weighed;
    (d) means for coupling the weighing platform to the load receiving surface of the load cell means;
    (e) first overload protective means connected to said frame proximate to the load cell means and extending toward said weighing platform, said first overload protective means being spaced from the second surface of said weighing platform for limiting downward movement thereof to a first distance; and
    (f) second overload protective means mounted on said frame and spaced from said load cell means, said second means being spaced from said weighing platform for limiting downward movement thereof to a second distance whereby overload protection of said load cell means is provided which is substantially independent of the location of the article on the weighing platform.

11. Apparatus in accordance with claim 10 wherein said second overload protective means comprises a plurality of upwardly extending stop members attached to said frame at spaced locations thereon, said stop members being spaced from the second surface of the weighing platform.

12. Apparatus in accordance with claim 11 wherein said first overload protective means comprises a pair of upwardly extending stop members attached to said frame, each of said pair being spaced adjacent to opposing sides of the load cell means and spaced from the second surface of the weighing platform by the first distance.

13. Apparatus in accordance with claim 12 wherein said means for coupling the weighing platform to the load receiving surface of the load cell means comprises a plurality of support arms having first and second ends, said first ends being affixed to the load receiving surface of the load cell means and said second ends being secured to the peripheral portion of the weighing platform.

14. Apparatus in accordance with claim 13 wherein the stop members of said second overload protective means are spaced from the second ends of the support arms by the second distance to thereby limit the downward movement of said weighing platform.

* * * * *